United States Patent
Hedman

(10) Patent No.: US 9,593,744 B2
(45) Date of Patent: Mar. 14, 2017

(54) GEAR ARRANGEMENT AND DUAL-CLUTCH TRANSMISSION PROVIDED THEREWITH

(75) Inventor: Anders Hedman, Marstrand (SE)

(73) Assignee: Volve Lastvagnar AB, Göteborg (SE)

( * ) Notice: Subject to any disclaimer, the term of this patent is extended or adjusted under 35 U.S.C. 154(b) by 203 days.

(21) Appl. No.: 14/401,636

(22) PCT Filed: Jun. 25, 2012

(86) PCT No.: PCT/EP2012/002667
§ 371 (c)(1),
(2), (4) Date: Nov. 17, 2014

(87) PCT Pub. No.: WO2014/000751
PCT Pub. Date: Jan. 3, 2014

(65) Prior Publication Data
US 2015/0114153 A1    Apr. 30, 2015

(51) Int. Cl.
*F16H 3/08* (2006.01)
*F16H 3/091* (2006.01)
*F16H 3/00* (2006.01)

(52) U.S. Cl.
CPC ............. *F16H 3/091* (2013.01); *F16H 3/006* (2013.01); *F16H 2003/0807* (2013.01); *Y10T 74/1956* (2015.01)

(58) Field of Classification Search
CPC .. F16H 3/0915; F16H 3/06; F16H 2003/0807; F16H 3/40; F16H 3/083; F16H 2003/0822; F16H 2200/2094
(Continued)

(56) References Cited

U.S. PATENT DOCUMENTS 4,065,981 A * 1/1978 Whateley ................ F16H 3/095
74/331
4,297,906 A * 11/1981 Costello ................ F16H 3/0915
74/375
(Continued)

FOREIGN PATENT DOCUMENTS

DE   10 2006 031263 A1   1/2008
DE   10 2006 042212 A1   4/2008
(Continued)

OTHER PUBLICATIONS

International Search Report (Sep. 10, 2012) for corresponding International App. PCT/EP2012/002667.
(Continued)

*Primary Examiner* — William Kelleher
*Assistant Examiner* — Jake Cook
(74) *Attorney, Agent, or Firm* — WRB-IP LLP

(57) ABSTRACT

A gear arrangement includes a first and a second gearwheel where the first and second gearwheels are arranged next to each other upon a first shaft such that the first and second gearwheels can rotate relative to the first shaft. At least one gearwheel of the first and second gearwheels is arranged upon the first shaft such that it can be axially displaced between a distanced axial position and a contact axial position upon the first shaft, and whereby in the distanced axial position, the first and second gearwheels are distanced from each other and in the contact axial position, an axial contact between the first and second gearwheel is enabled.

9 Claims, 4 Drawing Sheets

(58) Field of Classification Search
USPC .................................. 74/321, 352, 410, 411
See application file for complete search history.

(56) References Cited

U.S. PATENT DOCUMENTS

| | | | | |
|---|---|---|---|---|
| 5,181,431 | A * | 1/1993 | Zaiser | F16H 3/006 |
| | | | | 192/48.609 |
| 5,722,291 | A * | 3/1998 | Fraley | F16H 3/089 |
| | | | | 74/325 |
| 5,927,147 | A * | 7/1999 | Morrow | F16H 1/08 |
| | | | | 74/410 |
| 6,179,743 | B1 * | 1/2001 | Morrow | F16H 1/2818 |
| | | | | 475/219 |
| 6,189,397 | B1 * | 2/2001 | Morrow | F16H 3/095 |
| | | | | 74/331 |
| 2002/0033062 | A1 * | 3/2002 | Obinata | F16H 3/093 |
| | | | | 74/410 |
| 2003/0154811 | A1 | 8/2003 | Hattori et al. | |
| 2010/0242647 | A1 * | 9/2010 | Okadome | F16H 3/093 |
| | | | | 74/331 |
| 2011/0314940 | A1 * | 12/2011 | Morrow | F16H 1/08 |
| | | | | 74/410 |

FOREIGN PATENT DOCUMENTS

| | | |
|---|---|---|
| EP | 0 409 803 A1 | 1/1991 |
| WO | 8809450 A | 12/1988 |

OTHER PUBLICATIONS

International Preliminary Report on Patentability (Sep. 4, 2014) for corresponding International App. PCT/EP2012/002667.

* cited by examiner

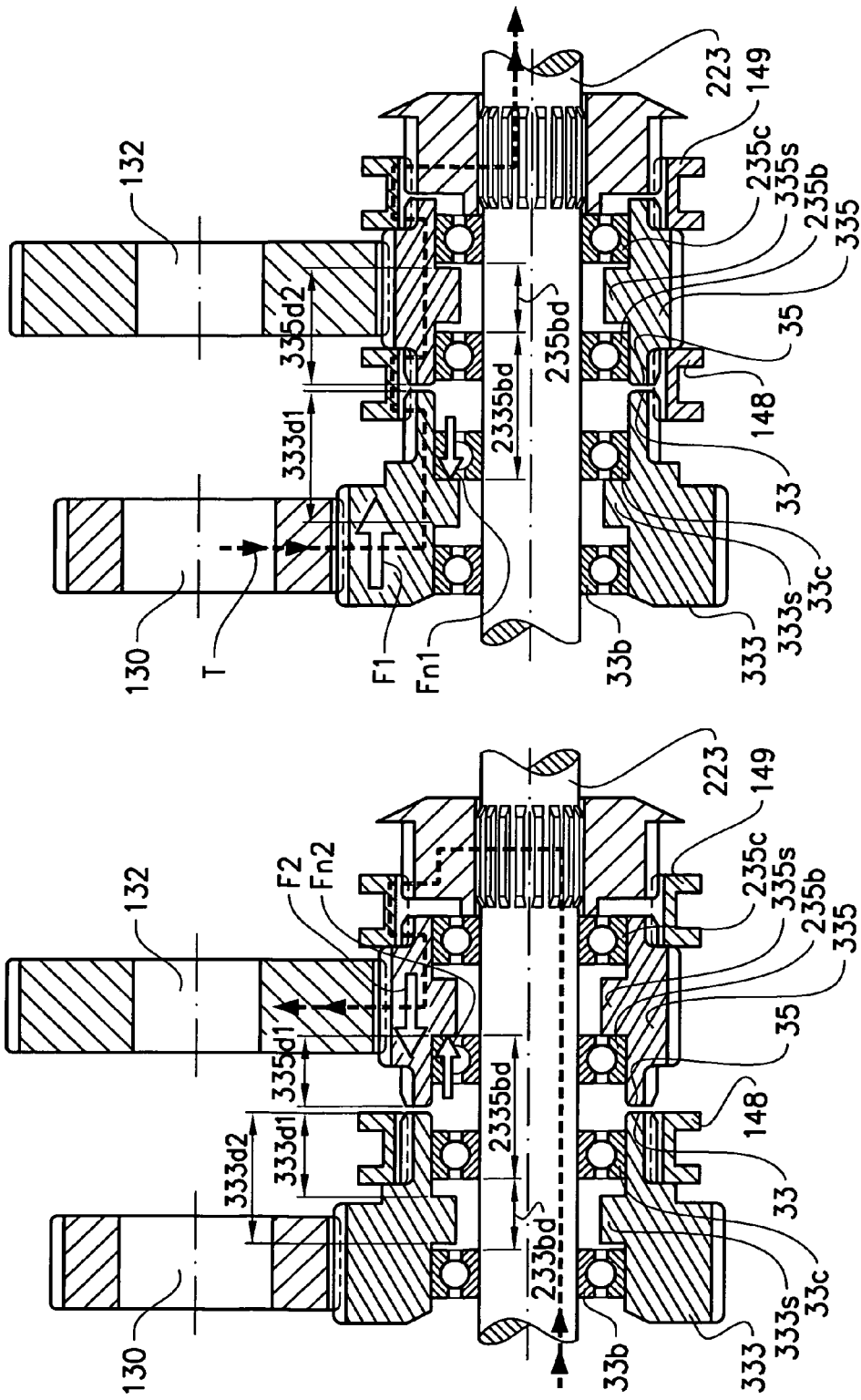

GEAR ARRANGEMENT AND DUAL-CLUTCH TRANSMISSION PROVIDED THEREWITH

BACKGROUND AND SUMMARY

The present invention relates to a gear arrangement comprising a first and a second gearwheel, the invention further relates to a transmission provided with an inventive gear arrangement.

In order to reduce the noise emission from two gearwheels meshing with each other, they can be provided with helical gear teeth. A disadvantage of helical gears is that during torque transfer between the gearwheels, the helical gear engagement causes axial gear mesh forces. The axial gear mesh forces will give a resulting, thrust along the axis of the gearwheel. The gearwheel must thereby be accommodated by appropriate bearings in order to take up the axial thrust Loose gearwheels arranged rotatably upon a shaft can be rotationally connected to each other and to the shaft by mechanical tooth clutches. This will be referred to as a stack of interconnectable loose gearwheels. This is common in dual clutch transmissions in order to limit the design to one countershaft.

Similarly, it is not uncommon in other types of transmissions to find stacks of interconnectable loose gearwheels that are rotatably arranged on bearings on a shaft and can selectably be rotationally locked to each other. One example is transmissions with a winding power flow, where the power is transferred back and forth more than once between two rotational axes.

In a stack of interconnectable loose gearwheels, at least one of the gearwheels can also be connected to the shaft. Torque can be transferred in different ways by means of selectable engagement of tooth clutches:
  between the shaft and the gear mesh of one of the gearwheels in the stack
  between the gear meshes of two adjacent gearwheels in the stack
  between the gear meshes of two non-adjacent gearwheels via intermediate gearwheels in the stack (the intermediate gearwheels would then function as power-transferring sleeves)

In the first case the shaft and the gearwheel in question will be rotationally locked. There will be no relative rotation between them, and the bearings that carry the gearwheel will not be subjected to any nominal life consumption.

In the second and third cases the two gearwheels with power-transferring gear meshes will be rotationally locked. In a general case they will rotate with a different speed than the shaft. So, the bearings that carry these gearwheels will be simultaneously subjected to loads from the gear mesh forces and relative rotation. This implies a consumption bearing life.

The bearing life of a stack of interconnectable loose gearwheels may be limiting for the overall durability of a transmission. In many cases it would not be possible to use stronger and larger bearings due to space limitations.

There is thus a need for an improved gear arrangement, which increases the lifecycle of the bearings within the gear arrangement.

It is desirable to provide an inventive gear arrangement with a longer lifecycle than previous known solutions.

The inventive gear arrangement comprises a first and a second gearwheel. The first and second gearwheels are arranged next to each other upon a first shaft such that said first and second gearwheels can rotate relative said first shaft. The gearwheels are thereby preferably arranged upon some kind of bearing arrangement, either as separate bearings or semi integrated bearings in which the outer ring is formed by a part of the inner surface of the gearwheels and/or the inner ring is formed by a part of the outer surface of the shaft.

The gear arrangement is characterised in, that at least one gearwheel of said first and second gearwheels is arranged upon said first shaft such, that it can be axially displaced between a distanced axial position and a contact axial position upon said first shaft. Further, in said distanced axial position, said first and second gearwheels are distanced from each other and in said contact axial position, an axial contact between said first and second gearwheel is enabled.

The inventive gear arrangement enables that, when the one gearwheel is positioned in the contact axial position, axial forces upon the one gearwheel directed towards the other gearwheel will be transferred to the other gearwheel. The axial loads upon the first and second gearwheels thereby cancel each other out. The axial load upon the bearings will be completely reduced or at least essentially reduced.

By using the inventive gear arrangement such, that the axial gear meshes forces from the first and the second gearwheel cancel each other out, when the first and/or the second gear wheel rotates relative the first shaft, the bearings do not have to be subjected to large axial load when they are subjected to rotation, whereby the lifecycle of the bearings upon which the gearwheels are mounted increases.

In a situation where there is no relative rotation between the gearwheels and the first shaft, i.e. no rotation in the bearings, the bearings can be subjected to axial load without any additional wear upon the bearings.

There are bearings that allow an axial displacement; the one gearwheel can be arranged upon such a bearing in order to facilitate the axial displacement of the one gearwheel. A bearing facilitating the axial displacement is preferably a needle, a cylindrical roller bearing or a toroidal roller bearing.

It is preferred that the at least one gearwheel is displaced into said contact axial position when it transfers a torque load. Gearwheels are subjected to axial forces when they are provided with helical gear teeth and transfer torque to another gearwheel meshing therewith. It is thereby provided that said at least one gearwheel is provided with helical gear teeth. The helical gear teeth is preferably directed such, that by transferring torque from or to the at least one gearwheel from a gearwheel meshing therewith, the at least one gearwheel is displaced in direction towards the other of the first and the second gearwheel, the direction is preferably chosen such, that the torque transfer direction that is most commonly used, is the one that causing the axial contact between the first and the second gearwheel.

In a preferred embodiment, both the first and the second gearwheels are arranged such upon said first shaft, that they both can be axially displaced between a distanced axial position and a contact axial position upon the first shaft.

It is further preferred that both said first and said second gearwheels are provided with helical gear teeth, whereby the helical gear teeth of said first gearwheel are cut in the same direction, i.e., have the same hand of helix, as the helical gear teeth of said second gearwheel. When the first and second gearwheels are locked to each other (and thereby rotate in the same direction and with the same speed) they will be pressed against each other due to the axial forces that arises when transferring, a torque to/from the gearwheels they are meshing with, when power is transferred in one direction between the first and second gearwheels and pressed away from each other when power is transferred in opposite direction.

It is preferred that the at least one gearwheel is mounted upon a first and a second bearing and that the at least one gearwheel can slide upon the first and second bearing. In order to provide a defined sliding distance, the at least one gearwheel is provided with an inwardly directed protrusion, whereby the at least one gearwheel is arranged such upon said first and second bearing, that the inwardly directed protrusion is placed between the first and the second bearing and thereby allows a defined axial displacement. Said protrusion may also be composed of a separate part, e.g., a retaining ring or a shoulder of a bearing outer ring, as would be known to a person skilled in the art.

In an alternative arrangement the defined sliding distance is provided by an outwardly directed protrusion, which is axially fixed to the first shaft, whereby the at least one gear wheel is axially fixed upon its bearings and the bearings are able to slide upon the first shaft. The axial relative motion is thereby limited by the outwardly directed protrusions upon the first shaft.

It is preferred that the gear arrangement is provided with a first synchronisation mechanism or a dog clutch enabling a rotational connection between said first and said second gearwheel. The first synchronisation mechanism ensures that the first and second gearwheel rotate in the same speed and direction, whereby the axial contact can does not interfere with the individual rotation of the first and second gearwheel.

It is further preferred that the gear arrangement is provided with a second synchronisation mechanism or a dog clutch, which enabling a synchronisation between one of said first and second gearwheel and said first shaft.

The inventive gear arrangement can be applied in a diversity of fields, and is especially useful in fields where a bearing failure or an exchange of bearings is critical and/or expensive. One such arrangement is a transmission and especially a dual-clutch transmission. The use of the inventive gear arrangement in a transmission increases the life cycle of a transmission and lowers its maintenance costs.

The gear transmission is preferably used in a transmission having a centre shaft and a countershaft, wherein said gear arrangement is provided upon said countershaft.

Preferably meshes at least said first gearwheel with a first primary gear teeth of said transmission and said second gearwheel with a gearwheel upon the centre shaft.

BRIEF DESCRIPTION OF THE DRAWINGS

The present invention will now be described in detail with reference to the figures, wherein.

DETAILED DESCRIPTION

Figures 1A, 1B:
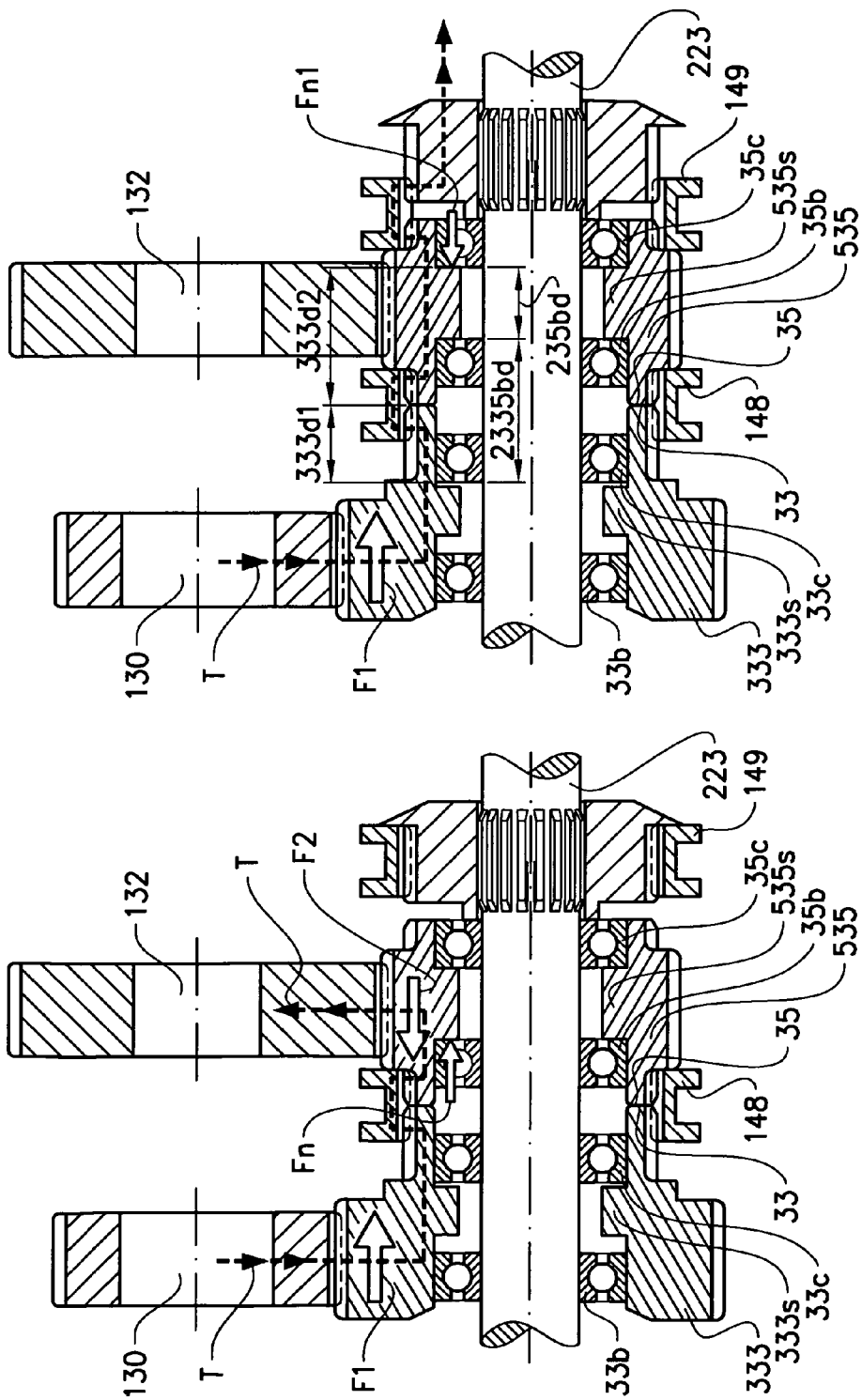
FIGS. 1 *a* and *b* shows an inventive gear arrangement with one axial displaceable gearwheel.

In the following only one embodiment of the invention is shown and described, simply by way of illustration of one mode of carrying out the invention.

The term bearing is considered to encompass all different kinds of bearings which could be suitable to use in the gear arrangement, wherein the most common are roller bearing, however plain bearings or other form of bearings also would be possible. In the figures, the gearwheels 333, 535, 335 in the gear arrangement are provided with helical gear teeth, which are directed such that the first and the second gearwheel 333, 535 are pressed against each other during a transfer of the torque load T in one of the directions. Obviously gearwheels 130, 132 meshing with any of these gearwheels 333, 335, 535 are also provided with helical gear teeth.

FIGS. 1 *a* and *b* discloses a first preferred embodiment of the invention. The gear arrangement comprises a first shaft 223 upon which said first and second gearwheel 333, 535 is arranged. Both gearwheels are arranged upon a pair of bearings comprising a first and second beating 33*b*, 33*c*; 35*b*, 35*c* respectively. The first gearwheel 335 however, is mounted such upon its pair of bearings 33*b*, 33*c* that it can be axially displaced thereupon. The axial displacement is defined by an inwardly directed protrusion (a shoulder) 333*s* upon the first gearwheel 333 and which protrusion 333*s* is arranged between the first and the second bearing 33*b*, 33*c*. The axial displacement of the first gearwheel 333 is thereby limited by the position and width of the inwardly directed protrusions 333*s* between the first and the second bearing 33*b*, 33*c*. Also the second gearwheel 535 is provided with an inwardly directed protrusion 535*s*. The inwardly directed protrusion 535*s* is however arranged such between the first and second bearing 35*b*, 35*c* of the second gearwheel 535, that it does not allow any significant axial displacement of the second gearwheel 535.

In the figures, the bearings are shown as being axially fixed to the shaft 223, and the first gearwheel 333 may have a relative axial motion that is limited by the inwardly directed Protrusion 333*s*. In an alternative arrangement the first bearing 331 is axially fixed on the gearwheels 33*b*, 33*c* and the axial relative motion being limited by shoulders on or axially fixed to the shaft 223.

The first gearwheel 333 is provided with a contact surface 33 in axial direction towards the second bearing 535. Second bearing 535 is provided with corresponding contact surface 35 in direction towards the first gearwheel 333.

In FIG. 1*a*, the synchronisation mechanism 148 has locked the first and second gearwheel 333, 535 to each other, which thereby rotate in the same direction and with the same speed. The first and the second gearwheel 333, 535 are disconnected from the first shaft 223, whereby there is a relative rotation between the two gearwheels 333, 535 and the first shaft 223. A torque load T is transferred from a gearwheel 130, which meshes with the first gearwheel 333, and further from the first to the second gearwheel 333, 535 over the synchronisation mechanism 148 and there from to a gearwheel 132, which meshes with the second gearwheel 535. The gearwheels 130, 132, 333, 535 are provided with helical gear teeth, which are directed such that the first and the second gearwheel 333, 535 are pressed against each other during a transfer of the torque load T in the direction shown.

Due to the helical gear teeth of the gearwheels 130, 132, 333, 535 the transfer of the torque load T thereby causes oppositely directed axial gear mesh forces F1, F2 upon the first and the second gearwheel 333, 535 respectively. The axial gear mesh force F1 upon the first gearwheel 333 causes the first gearwheel 333 to be axially displaced such that the axial contact surface 33 of the first gearwheel 333 comes in contact with the axial contact surface 35 of the second gearwheel 535.

Due to the axial displacement of the first gearwheel 333 during the torque transfer, the axial gear mesh forces F1, F2 are cancelled out and only the net axial force Fn needs to be transferred to the bearings, i.e. to the first bearing 235b of the second gearwheel 535. Because the bearings 33b, 33c, 35b, 35c not are subjected to any or essentially any axial load during the rotation, the wear of the bearings 33b, 33c, 35b, 35c is decreased, whereby the lifecycles of the bearings 33b, 33c, 35b, 35c are increased.

In FIG. 1b torque T is transferred from the first gearwheel 333 to the first shaft 223 over the first and second synchronisation mechanism 148, 149 and the second gearwheel 535. The axial gear mesh force F1 upon the first gearwheel 333 causes the first gearwheel 333 to be displaced such that the axial contact surface 33 of the first gearwheel 333 comes in contact with the axial contact surface 35 of the second gearwheel 535. The axial gear mesh force F1 on the first gearwheel 333 is thereby reacted via direct contact to the second gearwheel 535 and further to the first shaft 223 over the second bearing 35c of the bearing pair 35b, 35c of the second gearwheels 535. The bearings 33b, 33c and 35b are thereby relieved from axial forces. Because there are no relative motion between the two gearwheels 333, 535 and the first shaft 223, the axial load Fr upon the second bearing 35c of the second gearwheel 535, does not cause any additional wear upon the second bearing 35, because there are no relative rotation between the second gearwheel 535 and the first shaft 223.

In the embodiment shown in FIGS. 1a and 1b, the bearings 35b, 35c of the second gearwheel 535 is preferably tapered roller bearings. Tapered roller bearings have a comparably high axial load capacity, whereby they are able to handle the additional axial load from the first gearwheel in the state shown in FIG. 1b. Other types of bearing would also be possible, e.g., cylindrical roller bearings, as known by a person skilled in the art.

Further, for the embodiments disclosed in FIGS. 1a and 1b, it can be noted that it is required that the first gearwheel 333 transfers power, thereby being subjected to gear mesh forces, only when it is rotationally locked to the second gearwheel 535. Otherwise, there would be a sliding contact between the first and the second gearwheels 333, 535.

The FIGS. 2 a to 2d disclose an alternative embodiment of the invention, in which both the first and second gearwheel 333 and 335 are arranged such that they can be axially displaced. First gearwheel 333 is arranged in the same manner as for the embodiment disclosed in FIG. 1. The second gearwheel 335 is arranged in a correspondently manner, i.e. is provided with an inwardly directed protrusion (a shoulder) 335s upon the first gearwheel 333 and which protrusion 333s is arranged between the first and the second bearing 235b, 235c.

In the figures, the bearings 33b, 33s, 235b, 235c are shown as being axially fixed to the shaft 223, and each of the gearwheels 333, 335 may have a relative axial motion that is limited by the protrusions 333s, 335s. An alternative arrangement is that the bearings 33b, 33s, 235b, 235c are axially fixed on the gearwheels 333s, 335s and the axial relative motion being limited by shoulders on or axially fixed to the shaft 223.

Now the function of the inventive gear arrangement will be explained when torque T is transferred in different directions and to/from different gearwheels.

Figure 2A:
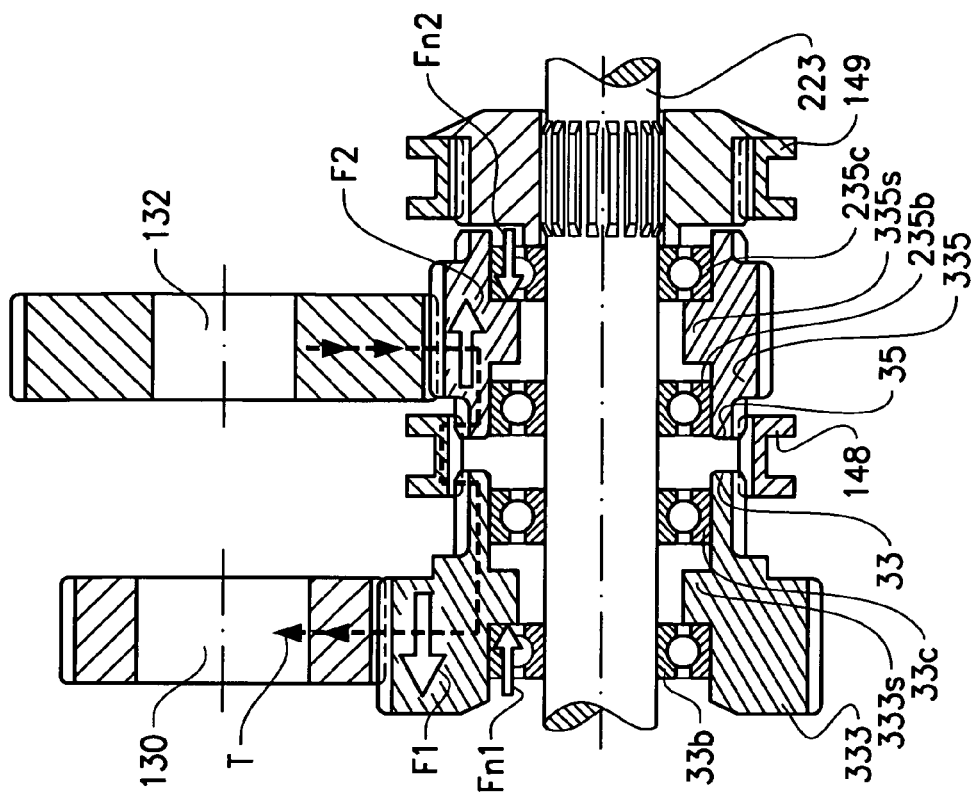
FIG. 2 *a* to 2*d* shows an inventive gear arrangement with two axial displaceable gearwheels

In FIG. 2a the same torque transfer as in FIG. 1a is disclosed, i.e. the torque T is transferred from a gearwheel 130, which meshes with the first gearwheel 333 and further from the first to the second gearwheel 333, 335 over the synchronisation mechanism 148 and there from to a gearwheel 132, which meshes with the second gearwheel 335.

The gearwheels 130, 132, 333, 335 are provided with helical gear teeth, which are directed such that the first and the second gearwheel 333, 335 are pressed against each other during a transfer of the torque load T in the direction shown.

Due to the helical gear teeth of the gearwheels 130, 132, 333, 335 the transfer of the torque load T thereby causes oppositely directed axial gear mesh forces F1, F2 upon the first and the second gearwheel 333, 335 respectively. The axial gear mesh forces F1, F2 upon the first and second gearwheel 333, 335 correspondently causes the first and the second gearwheel 333, 335 to be axially displaced such that the axial contact surface 33 of the first gearwheel 333 comes in contact with the axial contact surface 35 of the second gearwheel 335.

Due to the axial displacement of the first and second gearwheel 333, 335 during the torque transfer, the axial gear mesh forces F1, F2 cancel each other out and only the net axial force Fn needs to be taken up by the bearings. Dependent on which of the axial gear mesh forces F1, F2 that is the largest, the net axial force Fn will be taken up by either one of the second bearing 33c of the first gearwheel 333 or the first bearing 235b of the second gearwheel 335. In the situation shown in FIG. 2a, the axial gear mesh force upon the second gearwheel 335 is larger than the axial gear mesh force F1 upon the first gearwheel 333, whereby the first bearing 235b of the second gearwheel 335 must take up the net resulting force Fn.

The situation shown in FIG. 2a is preferably a situation in which the gear arrangement is commonly used, whereby the benefit of the axial force cancellation is as large as possible over time. A typical example is in a forward speed of a vehicle transmission.

Figure 2B:
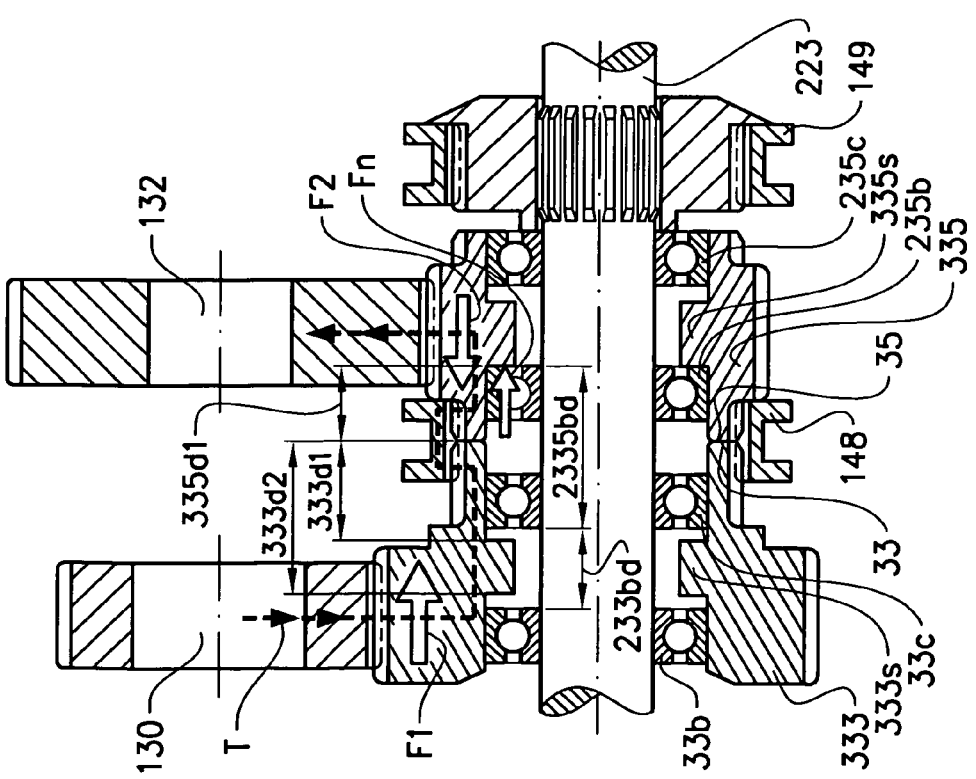

In FIG. 2b the torque load T is transferred in the opposite direction compared to FIG. 2a. Whereby the axial gear mesh forces F1, F2 also is directed away from each other. Hence, the first and the second gearwheel 333, 335 is axially displaced away from each other. Obviously, in this situation there will be no cancellation of the gear mesh forces F1, F2. The size of the axial net forces Fn1, Fn2 will thereby correspond to the corresponding axial gear mesh force F1, F2 and will be taken up by the outer bearings 33b, 235c.

The situation shown in FIG. 2b leads to that the full axial gear mesh loads F1, F2 must be taken up by the first bearing 33b of the first gearwheel 333 and the second bearing 235c of the second gearwheel 335 correspondently. Further, because the two gearwheels 333, 335 are not locked to the first shaft 223, the is a relative motion between the two gearwheels 333, 335 and the first shaft 223, whereby the wear of the bearings 33b, 235c will be higher in this situation. It is therefore preferred that the inventive gear arrangement is installed such that the situation in FIG. 2b occurs as little as possible, e.g. during engine braking of a vehicle.

FIG. 2c shows a condition in which torque load T is transferred from the first shaft 223 to a gear wheel 132 that meshes with the second gearwheel 335, whereby the synchronisation clutch 149 locks the second gearwheel to the first shaft 223. No torque transfer occurs in the first gearwheel 333 in the situation shown. The first gearwheel 333 is idling and rotating with a different speed than the first shaft 223. In this situation there is no relative rotation between the second gearwheel 335 and the first shaft 223, however between the first gearwheel 333 and the first shaft 223, and the first gearwheel 333 and the second gearwheel 335 there is as relative rotation Due to the axial gear mesh force F2 between the second gearwheel 335 and the therewith meshing gearwheel 132, the second gearwheel 335 is axially pressed against its first bearing 235b. The first bearing 235b must thereby take up the axial net force Fn2, which is essentially equal to the axial gear mesh force F2 upon the second gearwheel 335. However, because there is no relative rotation between the first shaft 223 and the second gearwheel 335 there is no additional wear of the bearing 235c that is subjected to the axial load Fn2.

The inwardly directed protrusion 333s of the first gearwheel 333 is adapted to allow an axial displacement of the first gearwheel 333 such that the axial contact surfaces 33, 35 of the first and the second gearwheel 333, 335 are not in contact with each other. If the first gearwheel 333 is in a position that its axial contact surface 33 comes in contact with the second gearwheels 335 axial contact surface 35, when the second gearwheel is axially displaced by the gear mesh force F2, the first gearwheel 333 will be pushed away from the second gearwheel 335. Interference between the first and the second gearwheel 333, 335 is thereby avoided.

FIG. 2d shows a condition in which a torque load T is transferred from a gearwheel 130 meshing with the first gearwheel 333 to the first shaft 223 over the first gearwheel 333, the first synchronisation mechanism 148, the second gearwheel 335 and the second synchronisation mechanism 149. No torque is transferred from the second gearwheel 335 to the gearwheel 132 meshing therewith, whereby the second gearwheel 335 is not subjected to any axial gear mesh forces. There is no relative rotation between the two gearwheels 333, 335 and the first shaft 223, whereby an axial load Fn1 upon the bearings does not influence the lifecycle of the bearings.

The first gearwheel 333 is however subjected to an axial gear mesh force F1, which presses the first gearwheel 333 towards the second gearwheel 335. The first gearwheel 333 is thereby axially pressed against its second bearing 333c. The second bearing 333c of the first gearwheel 333 must thereby take up the axial net force Fn1, which is essentially equal to the axial gear mesh force F1 upon the first gearwheel 335. The inwardly directed protrusion 335s of the second gearwheel 335 is adapted correspondently to the inwardly directed protrusion 333s such that a contact between the contact surfaces 33, 35 can be avoided, and thereby jamming of the gearwheels with each other will not occur.

There are some relevant distances between the different parts of the inventive gear arrangement. The following distances are defined in the FIGS. 1a, b and 2 a-d:

Distances upon the first gearwheel 333;
333d1: from the contact surface 33 to beginning of the downwardly directed protrusion 333s of the first gearwheel 333,
333d2: from the contact surface 33 to the end of the downwardly directed protrusion 333s of the first gearwheel 333.

Distances upon the second gearwheel 335, 535;
335d1: from the contact surface 35 to beginning of the downwardly directed protrusion 335s of the second gearwheel 335, 535,
335d2: from the contact surface 35 to the end of the downwardly directed protrusion 335s of the second gearwheel 335, 535.

Distances between the bearings 33b, 33c; 35b, 35c; 235b, 233c;
233bd: Between the first and second bearing 33b, 33c of the first gearwheel 333

235bd: Between the first and second bearing 35b, 35c; 235b, 235c of the second gearwheel 335
2335bd: Between the inner surface of the second bearing 33c of the first gearwheel 333 and the inner surface of the first bearing 35b; 235b of the second gearwheel 335, 535.

For the situation disclosed in FIG. 2a, the following must be fulfilled in order to enable the axial gear mesh forces to cancel each other out:

$$333d1+335d1>2335bd. \qquad (a)$$

To make sure that the net axial force is transferred by bearings 235b, the following applies:

$$233bd+2335bd>333d2+335d1 \qquad b)$$

If b) not is fulfilled, the net axial force Fn would be transferred by the first bearing 33b of the first gearwheel 333. More importantly, in the situation shown in FIG. 2c, the first gearwheel 333 would not be able to be axial displaced far enough to avoid that the contact surfaces 33, 35 are in contact with each other.

A general conclusion is found for situations as in FIG. 2a, where axial forces are cancelled out between the gearwheels 333, 335 that are locked rotationally to each other: The net axial force Fn shall not be transferred by the bearings of a gearwheel 333 that transfers power only when it is rotationally connected to other gearwheels 335 in the in the gear arrangement.

In order to avoid jamming of the second gearwheel 335 in FIG. 2d, the following inequality is valid:

$$2335bd+235bd>333d1+335d2 \qquad c)$$

In order to allow just one gearwheel 333 to be axially displaceable the following inequality must be valid:

$$2335bd+235bd<333d1+335d2 \qquad d)$$

Figure 3:
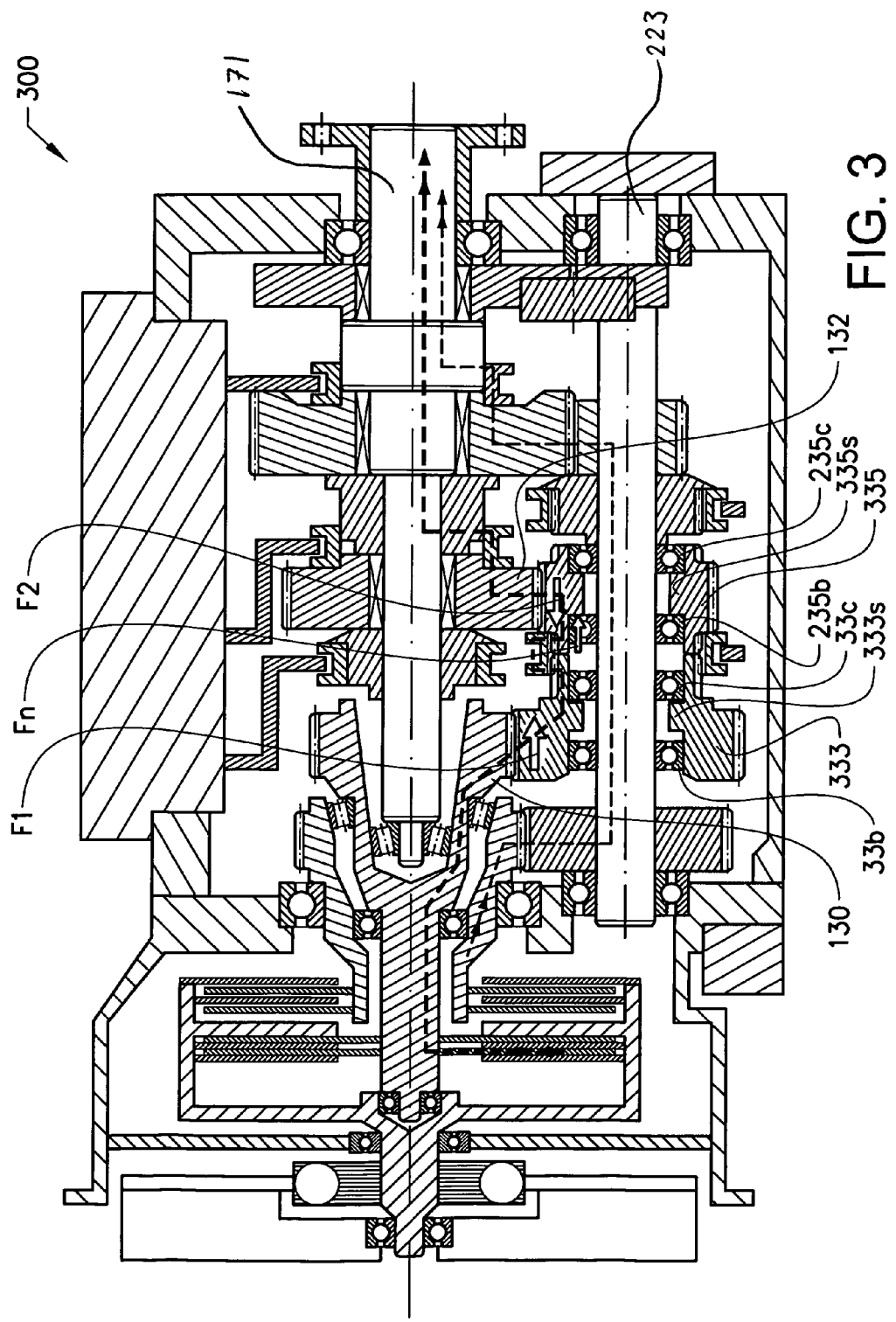
FIG. 3 shows a transmission provided with a gear arrangement according to the invention.

FIG. 3 discloses a dual-clutch transmission 300 provided with a gear arrangement according to the invention. The gear arrangement is provided upon the countershaft 223 and has two gearwheels 333, 335, which both are axially displaceable according to the invention.

The first gearwheel 333 is meshing with the first primary gear teeth 130 of the transmission 300. The second gearwheel 335 is meshing with a secondary loose gearwheel 134 upon a central shaft 171 of the transmission 300.

In the transmission in FIG. 3, the torque is transmitted from an engine in the third gear, and the second gear is preselected. The situation in FIG. 3 corresponds to the situation shown in FIG. 2a, i.e. the gear mesh force F2 upon the second gearwheel 335 is larger than the axial gear mesh force F1 upon the first gearwheel 333. The resulting net force Fn is taken up by the first bearing 235b of the second gearwheel 335. The resulting net force Fn is reduced and ideally close to zero, due to that the axial gear mesh forces F1 and F2 cancel each other out.

The axial loads upon the bearings 33b, 33c; 35b, 35c; 235b, 235c are thereby reduced and the lifecycle of the bearings 33b, 33c; 35b, 35c; 235b, 235c are increased because the bearings are not subjected to axial loads during rotation. The robustness of the transmission 300 is thereby increased.

The situation shown in FIG. 2b in the transmission shown in FIG. 3 corresponds to an engine braking in the third gear when second gear is preselected.

The situation shown in FIG. 2c in the transmission shown in FIG. 3 corresponds to that torque is transmitted from an engine in a fourth forward gear when the fifth gear is preselected.

The situation shown in FIG. 2d in the transmission shown in FIG. 3 corresponds to that torque is transmitted in the first gear and the second gear is preselected.

As will be realised, the invention is capable of modification in various obvious respects, all without departing from the scope of the appended claims.

Accordingly, the drawings and the description thereto are to be regarded as illustrative in nature, and not restrictive.

The invention claimed is:

1. A gear arrangement comprising a first and a second gear wheel, whereby the first and second gearwheels are arranged next to each other upon a first shaft such, that the first and second gearwheels can rotate relative the first shaft, wherein at least one gearwheel of the first and second gearwheels is arranged upon the first shaft such, that it can be axially displaced between a distanced axial position and a contact axial position upon the first shaft, and whereby in the distanced axial position, the first and second gearwheels are distanced from each other and in the contact axial position, an axial contact between the first and second gearwheel is enabled, wherein both the first and the second gearwheel are provided with helical gear teeth, whereby the helical gear teeth of the first gearwheel are cut in the same direction as the helical gear teeth of the second gearwheel, wherein the at least one gearwheel is mounted upon a first and a second roller bearing such that the at least one gearwheel can slide thereupon, and the at least one gearwheel is provided with an inwardly directed protrusion arranged such between the first and second roller bearing such that axial displacement is allowed.

2. The near arrangement according to claim 1, wherein the at least one gearwheel is displaced into the contact axial position when it transfers a torque load.

3. The gear arrangement according to claim 1, wherein the gear arrangement is provided with a synchronisation mechanism or a dog clutch enabling a rotational connection between the first and the second gearwheel.

4. The gear arrangement according to claim 1, wherein the gear arrangement is provided with a second synchronisation mechanism or a dog clutch enabling a rotational connection between one of the first and second gearwheel and the first shaft.

5. The gear arrangement according to claim 1, wherein the axial displacement of the at least one gearwheel, from the distanced axial position to the contact axial position, is actuated when the at least one gearwheel transfers a torque load to another gearwheel.

6. A transmission provided with a gear arrangement according to claim 1.

7. The transmission according to claim 6, wherein the transmission is a dual-clutch transmission.

8. The transmission according to claim 6, wherein the transmission is provided with a centre shaft and a countershaft and wherein the first shaft is the countershaft and the gear arrangement is provided upon the countershaft.

9. The transmission according to claim 8, wherein the first gearwheel meshes with first primary gear teeth of the transmission and the second gearwheel meshes with a gearwheel arranged upon the centre shaft.

* * * * *